United States Patent
Ruf Morales et al.

(10) Patent No.: US 6,260,435 B1
(45) Date of Patent: Jul. 17, 2001

(54) BRAKE LEVER FOR SECURITY BRAKE MECHANISMS OF MOTOR VEHICLES

(75) Inventors: Francisco Ruf Morales, Sant Feliu de Llobregat; Jose Antonio Carcaño Sobre, Sabadell, both of (ES)

(73) Assignee: Fico Cables, S.A., Barcelona (ES)

( * ) Notice: Subject to any disclaimer, the term of this patent is extended or adjusted under 35 U.S.C. 154(b) by 0 days.

(21) Appl. No.: 09/269,900

(22) PCT Filed: Aug. 26, 1997

(86) PCT No.: PCT/ES97/00214

§ 371 Date: Apr. 2, 1999

§ 102(e) Date: Apr. 2, 1999

(87) PCT Pub. No.: WO98/17512

PCT Pub. Date: Apr. 30, 1998

(30) Foreign Application Priority Data

Oct. 22, 1996 (ES) .................................................. 9602227

(51) Int. Cl.⁷ ...................................................... G05G 1/04
(52) U.S. Cl. ................................. 74/523; 74/543; 74/501.6
(58) Field of Search ........................... 74/501.5 R, 500.5, 74/502.2, 512, 513, 523, 527, 530, 543, 475; 192/93 A

(56) References Cited

U.S. PATENT DOCUMENTS

| 4,353,265 | * | 10/1982 | Lipshield | 74/501.5 R |
| 4,373,402 | * | 2/1983 | Barrett | 74/512 X |
| 4,770,057 | * | 9/1988 | Foggini | 74/523 |
| 5,052,524 | * | 10/1991 | Husted | 188/2 D X |
| 5,265,493 | * | 11/1993 | Solano et al. | 74/501.5 R |

* cited by examiner

Primary Examiner—Vinh T. Luong
(74) Attorney, Agent, or Firm—Michael J. Striker

(57) ABSTRACT

A brake lever for automobile vehicle safety brake has a power arm with a hand grip portion provided with a longitudinal cavity and a rear portion linked to the hand grip portion and having a U-shaped cross-section with two plates spaced from one another and prolonged longitudinally to form resistance arms.

18 Claims, 4 Drawing Sheets

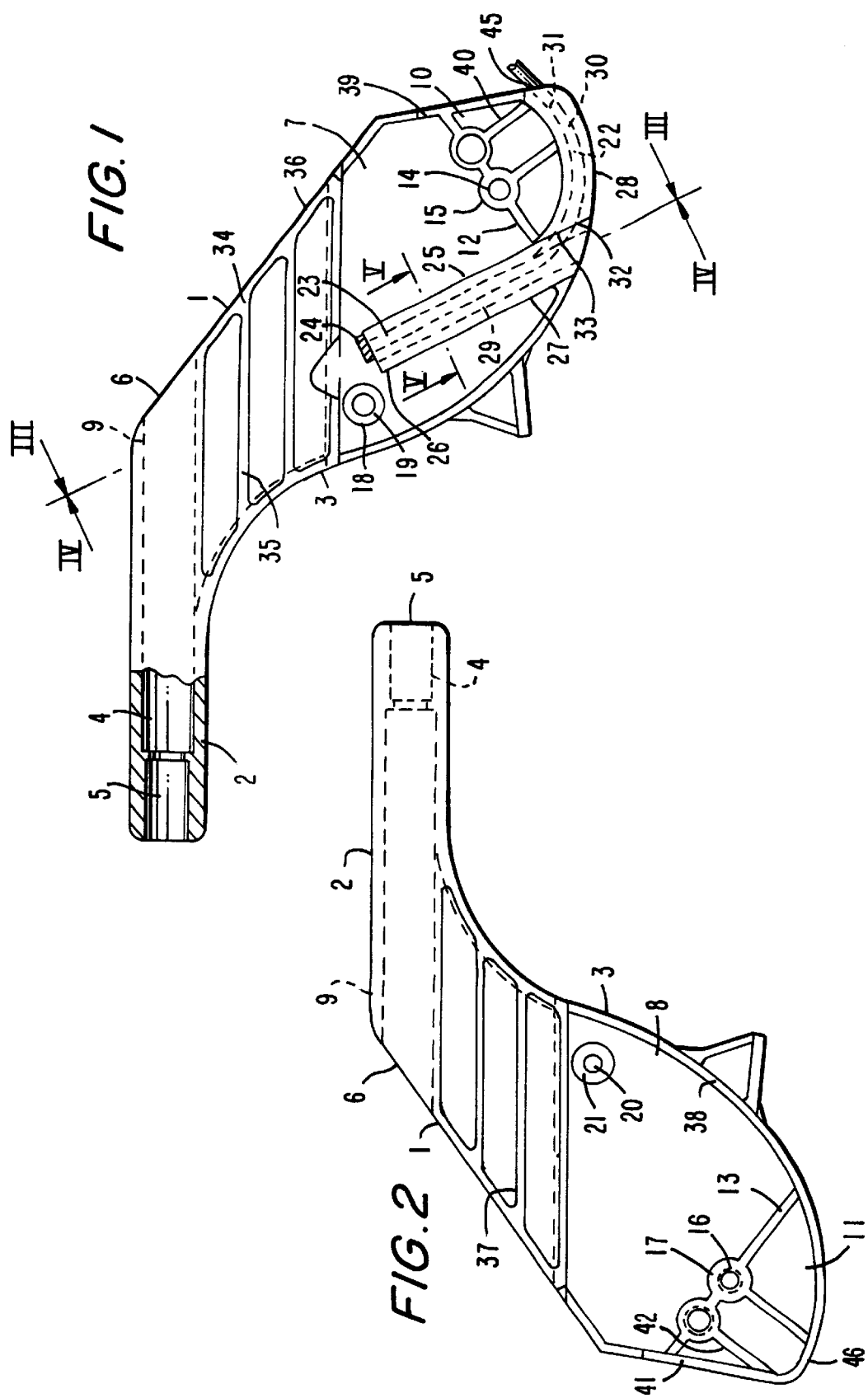

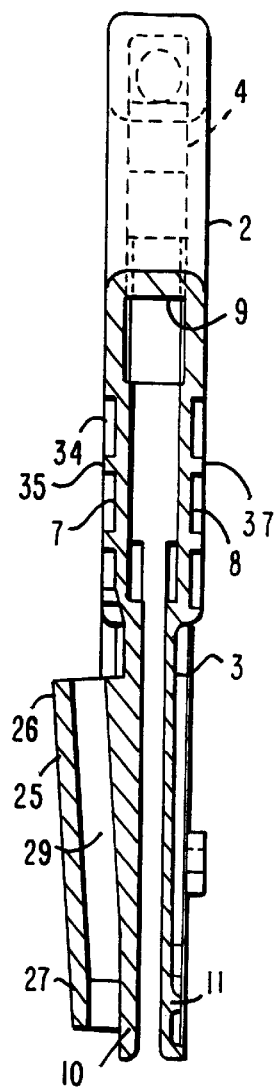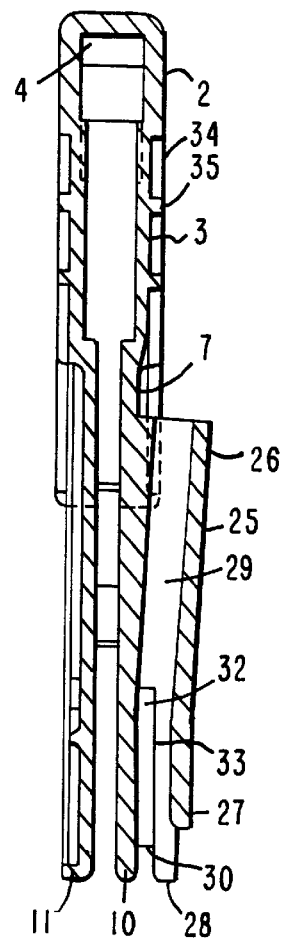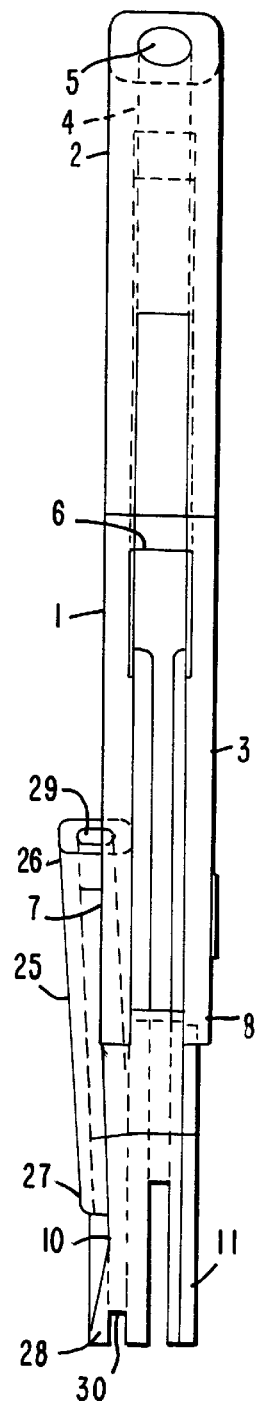
FIG.3
FIG.4
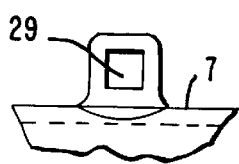
FIG.5
FIG.6

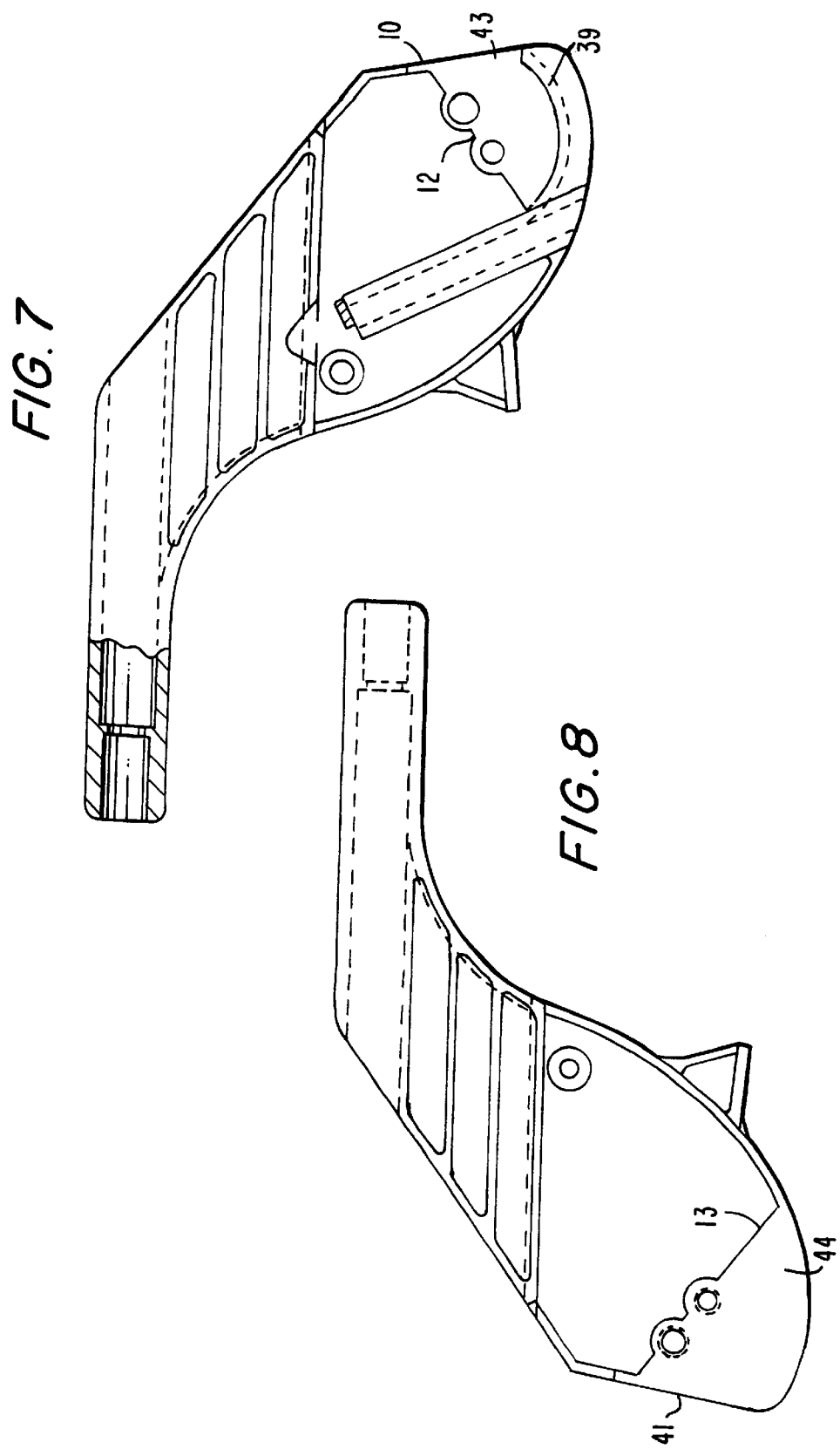

BRAKE LEVER FOR SECURITY BRAKE MECHANISMS OF MOTOR VEHICLES

TECHNICAL FIELD OF THE INVENTION

The object of the invention is a brake lever for automobile vehicle safety brake mechanisms, which is particularly applicable to hand-operated safety brake mechanisms.

BACKGROUND OF THE INVENTION

As is widely known, automobile safety brake mechanisms which can be operated by hand basically comprise the following known parts: a brake lever coupled by means of a pivot pin to a support fixed to the structure of the vehicle, in such a way that said coupling allows the user to rotate the brake lever in both directions between two preset positions, a rest position and a braking position, respectively, while the brake lever includes means for fixing the corresponding end of the steel cable of the control cable which links the brake mechanism with the brake shoe or brake caliper actuating mechanism; a ratchet which includes a lever, or ratchet lever, coupled by means of a pivot pin to the brake lever in such a way that said coupling permits rotation of the ratchet lever in both directions between two preset positions, a rest position and a braking position of the brake lever, respectively; and a ratchet-control device which, coupled to the brake lever, can be operated manually and acts upon the ratchet lever, and more specifically upon its power arm.

In general, on the brake lever the power arm has a substantially elbowed configuration in which two portions can be distinguished, a front or handgrip portion and a rear portion, respectively, the resistance arm consisting in a prolongation of said rear portion of the power arm. The ratchet-control device is mounted on the power arm and on the handgrip, while the rear portion is fitted with the ratchet and the means for securing the end of the steel cable of the control cable, and the resisting arm includes guiding means for the end portion of the steel cable.

It is usual practice for the brake lever to be made up of two metal plates which are to a certain extent symmetrical to each other, which plates when attached to each other form the brake lever as such on which the aforesaid parts are mounted: the ratchet; the ratchet-control device; the means for fixing the end of the steel cable of the control cable; and the guiding means for the end portion of the steel cable.

The fact that the brake lever is made up of two plates which can be coupled together, and the fact that other pieces are required for attaching the plates to each other, means high factory production and assembly costs which notably increase the cost of the safety brake mechanism.

SUMMARY OF THE INVENTION

A brake lever of new structure and operation for automobile vehicle safety brake mechanisms is made known hereby in order to provide a solution for the high cost of the known embodiments of brake levers such as those described above which have a structure of two plates which can be attached to each other.

The brake lever of the invention comprises means for coupling thereof to a support fixed to the structure of the vehicle by means of a pivot pin which permits rotation of the brake lever in both directions between two preset positions, a rest position and a braking position, respectively, means for attachment of a lever position-fixing ratchet, means for attachment of a ratchet-control device, means for fixing the end of an end portion of the steel cable of a control cable, and guiding means for said end portion of steel cable.

The brake lever of the invention is characterized in that it is single-piece, obtained by injection of plastic material, in which the power arm is of generally elbowed shape and comprises a front or handgrip portion in which there is a longitudinal cavity with open ends and a rear portion which, linking with the handgrip, is of generally U-shaped cross section forming two plates facing and parallel to each other, a first plate and second plate respectively, each one at a relatively short distance from the other, while both first and second plates are prolonged longitudinally to form first and second resistance arms, respectively.

According to another characteristic of the brake lever of the invention, the longitudinal cavity of the handgrip is designed to receive the ratchet-control device.

According to another characteristic of the brake lever of the invention, the first and second plates include means for attachment of the ratchet.

According to another characteristic of the brake lever of the invention, the first plate includes means for securing the end of the end portion of the steel cable of the control cable.

According to another characteristic of the brake lever of the invention, the exterior end of the first resistance arm includes guiding means for the end portion of the steel cable.

According to another characteristic of the brake lever of the invention, the means for attaching the ratchet include, on each plate and facing each other, a through-orifice with a reinforcing rim on its exterior mouth.

According to another characteristic of the brake lever of the invention, the fixing means of the end of the end portion of the steel cable include a fixing projection running longitudinally with respect to the first plate provided with a longitudinal through orifice.

According to another characteristic of the brake lever of the invention, the guiding means of the end portion of the steel cable include a channel one of whose ends, the interior end, links tangentially with the longitudinal through orifice of the fixing projection, while its other end, the exterior end, forms a mouth designed to receive tangentially the end portion of the steel cable.

According to another characteristic of the brake lever of the invention, on the linkage of the first and second plates with the first and second resistance arms, respectively, there is a transverse structural reinforcement rib.

According to another characteristic of the brake lever of the invention, both plates, first and second, have structural reinforcement means which consist, on the exterior of each of them, in a plurality of ribs running transversally and in an outward-oriented perimetric lip.

According to another characteristic of the brake lever of the invention, both resistance arms, first and second, have structural reinforcement means which consist, on each of them, in an outward-oriented perimetric lip and a plurality of longitudinal ribs which link said lip with the transverse linking rib.

According to another characteristic of the brake lever of the invention, both resistance arms, first and second, have structural reinforcement means which consist, over the entire width of each of them, in a thickened section which runs between the transverse linking rib and the exterior end of the resistance arm.

BRIEF DESCRIPTION OF THE DRAWINGS

The drawing sheets of this specification show the brake lever for automobile vehicle safety brake mechanisms of the invention. In said drawings:

FIGS. 1 and 2 are respective side views of a first mode of embodiment of the brake lever of the invention;

FIG. 3 is the view corresponding to section III—III of FIG. 1;

FIG. 4 is the view corresponding to section IV—IV of FIG. 1;

FIG. 5 is a partial view corresponding to section V—V of FIG. 1;

FIG. 6 is a top view of the first mode of embodiment of the brake lever of the invention;

FIGS. 7 and 8 are respective side views of another mode of embodiment of the brake lever of the invention.

DESCRIPTION OF PREFERRED EMBODIMENTS

Figure 9:
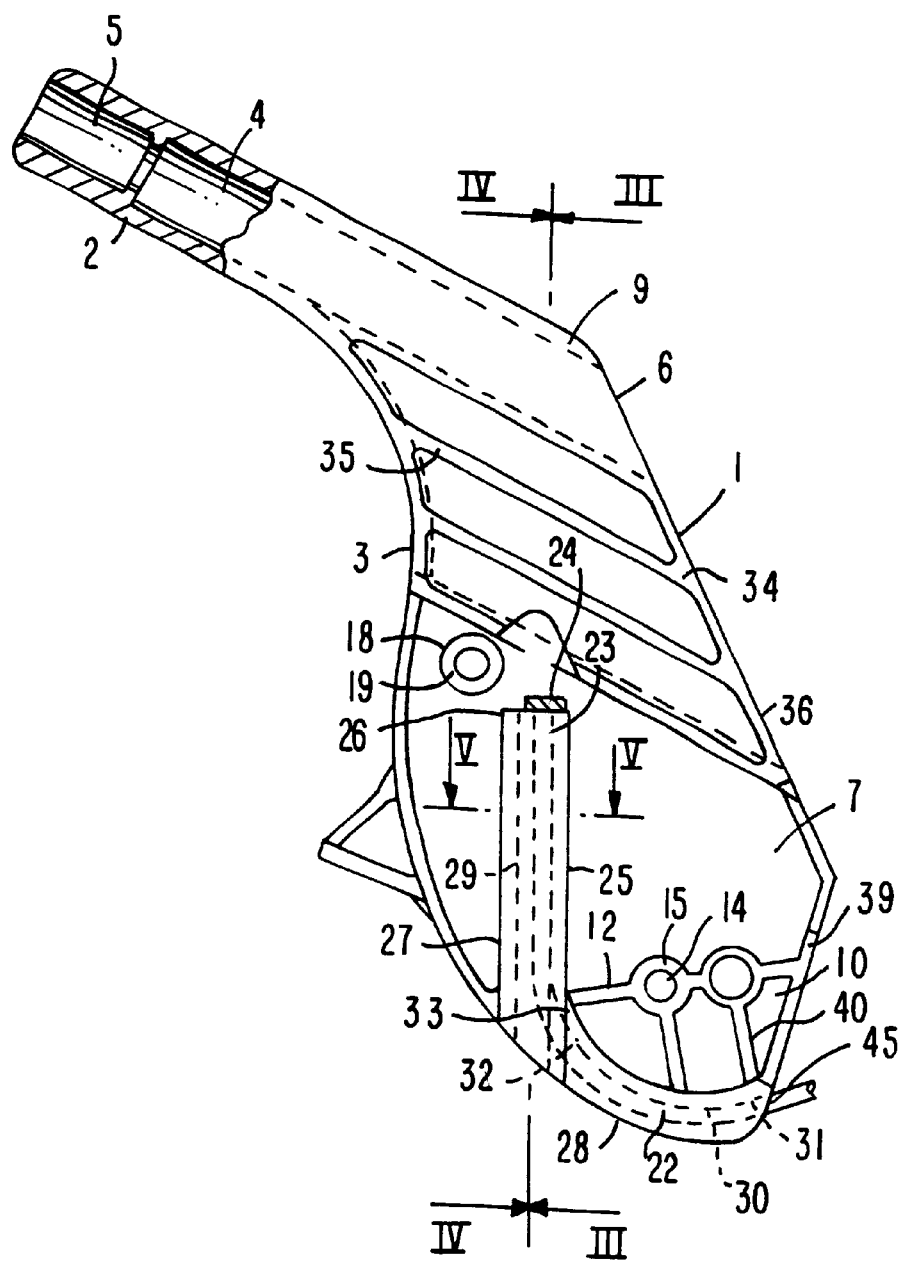
FIG. 9 is a side view of the brake lever of FIG. 1 in a braking position.

The figures of the drawing sheets show two modes =of embodiment of the brake lever for automobile vehicle safety brake mechanisms of the invention: a first mode is shown in FIGS. 1 to 6, and a second mode is shown in FIGS. 7 and 8. For the purposes of greater clarity of outline, the figures of the drawing sheets for both embodiments omit showing the following parts, because they are known in the art: a support fixed to the structure of the vehicle for attachment of the brake lever; a ratchet for fixing the position of the brake lever; and a ratchet control device, together with those other parts, such as stops, bolts, springs, etc., which do not form part of the invention but can be attached to the brake lever of the invention. Moreover, both examples of embodiment of the brake lever of the invention are given solely by way of non-restrictive example, for it is understood that the brake lever can adopt any other configuration which, being designed for each specific case of application, does not affect the essential nature of the invention.

The brake lever of the invention is single-piece and is obtained by injection of plastic material of suitable mechanical characteristics.

FIGS. 1 and 2 show how the brake lever comprises a power arm 1 of generally elbowed shape on which there can be distinguished a front or handgrip portion 2 and a rear portion 3. The handgrip 2 has a longitudinal cavity 4 having a cross section of quadrangular outline open at both its ends, the front end 5 and rear end 6 respectively, so dimensioned that it can receive a ratchet-control device (not shown). FIGS. 3 and 4 show how the rear portion 3 is generally U-shaped and forms two plates, first 7 and second 8 respectively, which are symmetrical to each other and linked by a back 9 which forms the longitudinal cavity 4, while both first 7 and second 8 plates run parallel to each other at a relatively short distance apart. Each one of the plates, first 7 and second 8, is prolonged longitudinally to form two resistance arms, first 10 and second 11 respectively, which are symmetrical to each other. FIGS. 1 and 2 show how on the linkage between the first plate 7 and the first resistance arm 10 there is a transverse structural reinforcement rib 12, and likewise, on the linkage of the second plate 8 and the second resistance arm 11 there is a transverse structural reinforcement rib 13. For the coupling of the brake lever to a support fixed to the structure of the vehicle (not shown) FIG. 1 shows how in the linkage between the first plate 7 and the resistance arm 10 there is a through-orifice 14 having to the exterior a reinforcing lip 15 which links with the transverse rib 12. Similarly, FIG. 2 shows how in the linkage between the second plate 8 and the second resistance arm 11 there is a through-orifice 16 facing the through-orifice 14 having to the exterior a reinforcing lip 17 which links with the transverse rib 13, with the pivot pin of the lever forming the longitudinal axis of both orifices 14, 16.

FIG. 1 shows how for the attachment of a ratchet to the brake lever, the first plate 7 has a through-orifice 18 having to the exterior a reinforcing perimetric lip 19. Similarly, FIG. 2 shows how for said coupling the second plate 8 has, facing the through-orifice 18, a through-orifice 20 having to the exterior a perimetric reinforcing lip 21.

FIG. 1 shows an end portion 22 of the steel cable of the control cable which links the brake lever of the invention with the actuating mechanism of the brake shoes or calipers (not shown); said end portion 22 has on its end 23 a terminal 24, shown schematically, which can adopt any other suitable configuration without this affecting the essential nature of the invention. For the fixing of said end 23 of the steel cable to the power arm 1 of the lever, FIGS. 1, 3, 4 and 6 show how the first plate 7 has a fixing projection 25 running longitudinally and having one of its ends, the interior end 26, at a relatively short distance from the through-orifice 18 for attachment of a ratchet, while its other end, the exterior end 27, reaches the exterior end 28 of the first resistance arm 10. The fixing projection 25 has a longitudinal through-orifice 29 of quadrangular cross section, as shown in detail in FIG. 5, this longitudinal orifice 29 being of dimensions such as to receive the end portion 22 of the steel cable, and the fixing projection 25 being designed so that the terminal 24 rests on its interior end 23, as shown in FIG. 1.

FIGS. 1, 4 and 6 show how for guiding of the end portion 22 of the steel cable, the first resistance arm 10 has on its exterior end 28 a channel 30 of quadrangular cross section designed to house the end portion 22 of the steel cable, with one of the ends of the channel 30, the exterior end 31, having a mouth 45 designed to receive tangentially the end portion 22 of the steel cable, while its other end, the interior end 32, leads tangentially and in coplanar fashion into the longitudinal through-orifice 29 through an opening 33 made in the exterior end 27 of the fixing projection 25 shown in FIGS. 1 and 4.

FIGS. 1, 3 and 4 show how the first plate 7 has to the exterior, on its intermediate portion 34 between the through-orifice for attaching a ratchet and the handgrip 2, three transverse ribs 35 which run across its entire width and a perimetric lip 36, these ribs 35 and lip 36 serving as structural reinforcement for the first plate 7 in order to avoid deformation thereof under normal working conditions. Similarly, FIGS. 2, 3 and 4 show how the second plate 8 has to the exterior three transverse ribs 37 and a perimetric lip 38, both for structural reinforcement.

FIG. 1 shows how the first resistance arm 10 has to the exterior a perimetric lip 39 and two longitudinal ribs 40 which link said lip 39 with the transverse rib 12 which links with the first plate 7; the lip 39 and the ribs 40 are for structural reinforcement of the first resistance arm 10 in order to avoid deformation thereof under normal working conditions. Similarly, FIG. 2 shows how the second resistance arm 11 has to the exterior a perimetric lip 41 and two longitudinal ribs, in both cases for structural reinforcement.

FIGS. 7 and 8 show a second mode of embodiment of the brake lever of the invention, which differs from the first mode of embodiment described above solely in the structural reinforcement of the first and second resistance arms 10, 11. For the purposes of greater clarity of outline, said FIGS. 7 and 8 omit reference numbers for all the parts common to both modes of embodiment. Thus, the structural reinforcement of the first resistance arm comprises a thickened section 43 which runs between the transverse linking rib 12 and the exterior end 28. Similarly, the structural reinforcement of the second resistance arm 11 comprises a thickened section 44 which runs between the transverse linking rib 13 and the exterior end 45.

What is claimed is:

1. A brake lever for automobile vehicle safety brake mechanisms, comprising a power arm having a generally elbowed shape and including a front hand grip portion provided with a longitudinal cavity having open ends and a rear portion linked with said hand grip portion and having a substantially U-shaped cross-section forming two plates which face and are parallel to each other, said plates including a first plate and a second plate prolonged longitudinally to form first and second resistance arms, each of said plates including a through-orifice with a reinforcing rim on its exterior mouth.

2. A brake lever as defined in claim 1, wherein said longitudinal cavity is formed to receive a ratchet-control device.

3. A brake lever as defined in claim 1, wherein said first and second plates include means for attaching of a ratchet.

4. A brake lever as defined in claim 1, wherein said first plate has means for securing an end of an end portion of a steel cable of a control device.

5. A brake lever as defined in claim 1, wherein said first resistance arm has an exterior end provided with guiding means for an end portion of a steel cable.

6. A brake lever as defined in claim 1; and further comprising a transverse structural reinforcement rib provided on a linkage of said first and second plates with said first and second resistance arms.

7. A brake lever as defined in claim 1, wherein each of said plates has a structural reinforcement including a plurality of ribs provided on an exterior of each of said plates and running transversely in an outward-oriented parametric lip.

8. A brake lever as defined in claim 1, wherein each of said resistance arms has a structural reinforcement including an outwardly-oriented parametric lip and a plurality of longitudinal ribs which link said lip with a transverse linking lip.

9. A brake lever as defined in claim 1, wherein each of said resistance arms has a structural reinforcement which includes over an entire width of each of said resistance arm a thickened section which runs between a transverse linking rib and an exterior end of a respective one of said resistance arms.

10. A brake lever for automobile vehicle safety brake mechanisms, comprising a power arm having a generally elbowed shape and including a front hand grip portion provided with a longitudinal cavity having open ends and a rear portion linked with said hand grip portion and having a substantially U-shaped cross-section forming two plates which face and are parallel to each other, said plates including a first plate and a second plate prolonged longitudinally to form first and second resistance arms; and a steel cable having an end portion with an end having a fixing projection which runs longitudinally with respect to said first plate and is provided with a longitudinal through orifice.

11. A brake lever as defined in claim 10, wherein said longitudinal cavity is formed to receive a ratchet-control device.

12. A brake lever as defined in claim 10, wherein said first and second plates include means for attaching of a ratchet.

13. A brake lever as defined in claim 10, wherein said first plate has means for securing said end portion of said steel cable.

14. A brake lever as defined in claim 10, wherein said first resistance arm has an exterior end provided with guiding means for said end portion of said steel cable.

15. A brake lever as defined in claim 10; and further comprising a transverse structural reinforcement rib provided on a linkage of said first and second plates with said first and second resistance arms.

16. A brake lever as defined in claim 10, wherein each of said plates has a structural reinforcement including a plurality of ribs provided on an exterior of each of said plates and running transversely in an outward-oriented parametric lip.

17. A brake lever as defined in claim 10, wherein each of said resistance arms has a structural reinforcement including an outwardly-oriented parametric lip and a plurality of longitudinal ribs which link said lip with a transverse linking lip.

18. A brake lever as defined in claim 10, wherein each of said resistance arms has a structural reinforcement which includes over an entire width of each of said resistance arm a thickened section which runs between a transverse linking rib and an exterior end of a respective one of said resistance arms.

* * * * *